Jan. 1, 1957 C. L. ESTES 2,776,366

COMMUNICATION SYSTEM UTILIZING COMPOSITE RADIATION PATTERN

Filed July 19, 1954

INVENTOR
CHARLES L. ESTES

BY Ernest Fanwick
ATTORNEY

United States Patent Office 2,776,366

Patented Jan. 1, 1957

2,776,366

COMMUNICATION SYSTEM UTILIZING COMPOSITE RADIATION PATTERN

Charles L. Estes, Scottsdale, Ariz., assignor to International Telephone and Telegraph Corporation, Nutley, N. J., a corporation of Maryland Application July 19, 1954, Serial No. 444,222

4 Claims. (Cl. 250—6)

This invention relates to communication systems and more particularly to a means for reducing signal fading in communication systems of the pulse modulation type when employed in conjunction with moving vehicles, such as aircraft.

In the past aircraft communication systems have employed antenna arrangements for receiving and/or radiating radio waves which are mounted to extend either upwards or downwards from the body of the aircraft. However, such arrangements suffer under the fundamental disadvantage that the electromagnetic wave received and/or radiated is considerably affected by the metallic structure of the aircraft to the extent that the reception or radiation does not exhibit the predicted radiation pattern. For instance, if it is assumed that the antenna arrangement includes vertical dipoles, instead of the desired circular radiation pattern, the metallic surface of the aircraft will tend to distort the circular radiation pattern in a manner to present one or more maximum or minimum therein. Such a distortion becomes still more harmful when the aircraft banks or otherwise deviates from a straight line course since the wings or other surfaces will act to intercept or reradiate the radio waves.

It has been suggested in U. S. Patent #2,235,015 to H. Eggers that the distortion hereinabove described may be eliminated to a certain extent if the antenna arrangement includes at least two antennas which are simultaneously excited are disposed in vertical alignment on the upper and lower surfaces of an aircraft, respectively. The antenna patterns of these antennas mutually supplement each other in a manner to provide an effective uniform composite radiation pattern.

While this antenna arrangement tends to reduce the distortion interposed in the antenna pattern by the surfaces of the aircraft, there is a serious disadvantage of such a system in that there is an overlapping of the same signal. This simultaneous transmission of the same signal from two different antennas will increase the possibility of fading of the transmitted signal at the usual receiver. Thus, it may be necessary, in order to obtain a continuous output from the receiver, to employ a more complicated receiver of the diversity type.

An object of this invention is the provision of an improved communication system employed in conjunction with moving vehicles, such as aircraft.

Another object of this invention is the provision of a pulse type communication system appreciably reducing the fading out of signals transmitted from or received at moving vehicles, such as aircraft.

A further object of this invention is the provision of a pulse time modulation air-to-air or air-to-ground communication system employing an antenna system having at least two radiators fed from a single source of modulating energy for the excitation thereof in time sequence to produce a composite radio wave having two identical modulation portions, one following the other, and a receiving arrangement capable of receiving the composite radio waves having means to normally select a given one of the modulation portions if the signal strength thereof is sufficient and to respond to the other modulation portion if said given portion does not have sufficient signal strength.

A feature of this invention is to provide at the transmission end of a communication system utilized in conjunction with moving vehicles at least two antennas cooperating from different positions on said vehicle to provide a given composite radiation pattern, a source of modulating signals, said modulating signals comprising a pulse train including a synchronizing signal and one or more channel signals, and coupling means coupling said source to said antennas in time sequence to radiate a composite radio wave having two identical interleaved pulse trains, said coupling means including two radio frequency transmitters one directly coupled to each of said antennas, a conductor coupled between said source and one of said transmitters and a time delay device coupled between said source and the other of said transmitters.

Another feature of this invention is to provide on a moving vehicle two antennas cooperating from different positions on said vehicle to provide a given composite radiation pattern, a source of pulse trains having a synchronizing signal and one or more channel signals, and coupling means coupling said source to said antennas in time sequence to radiate a composite radio wave having two identical interleaved pulse trains, said coupling means including a radio frequency transmitter directly coupled to said source, a conductor coupling said transmitter to one of said antennas and a time delay device coupling said transmitter to the other of said antennas.

Still another feature of this invention is to provide a receiving arrangement, preferably at a ground station, having a single radio frequency receiving portion for receiving a composite radio wave having identical interleaved pulse trains and a means to normally select the synchronizing signal of a given one of the pulse trains for channel demodulation thereof and to block the synchronizing signal of the other pulse train when said given one is of a receivable signal strength and to respond to the synchronizing signal of the other of said pulse trains for channel demodulation thereof when said given pulse train is not of a receivable strength.

A further feature of this invention is to provide a receiving arrangement, preferably in aircraft, having a pair of radio frequency receiving portions, each of said receiving portions capable of receiving at different locations on said aircraft a composite radio wave having identical interleaved pulse trains and synchronizing signal-channel demodulating means common to the output of said receiving portions to normally select the synchronizing signal of a given one of the pulse trains for channel demodulation thereof and to block the synchronizing signal of the other pulse train when said given one is of a receivable signal strength and to respond to the synchronizing signal of the other of said pulse trains for channel demodulation thereof when said given pulse train is not of a receivable strength.

The above-mentioned and other features and objects of this invention will become more apparent by reference to the following description taken in conjunction with the accompanying drawings, in which.

Figures 1, 2, 3:
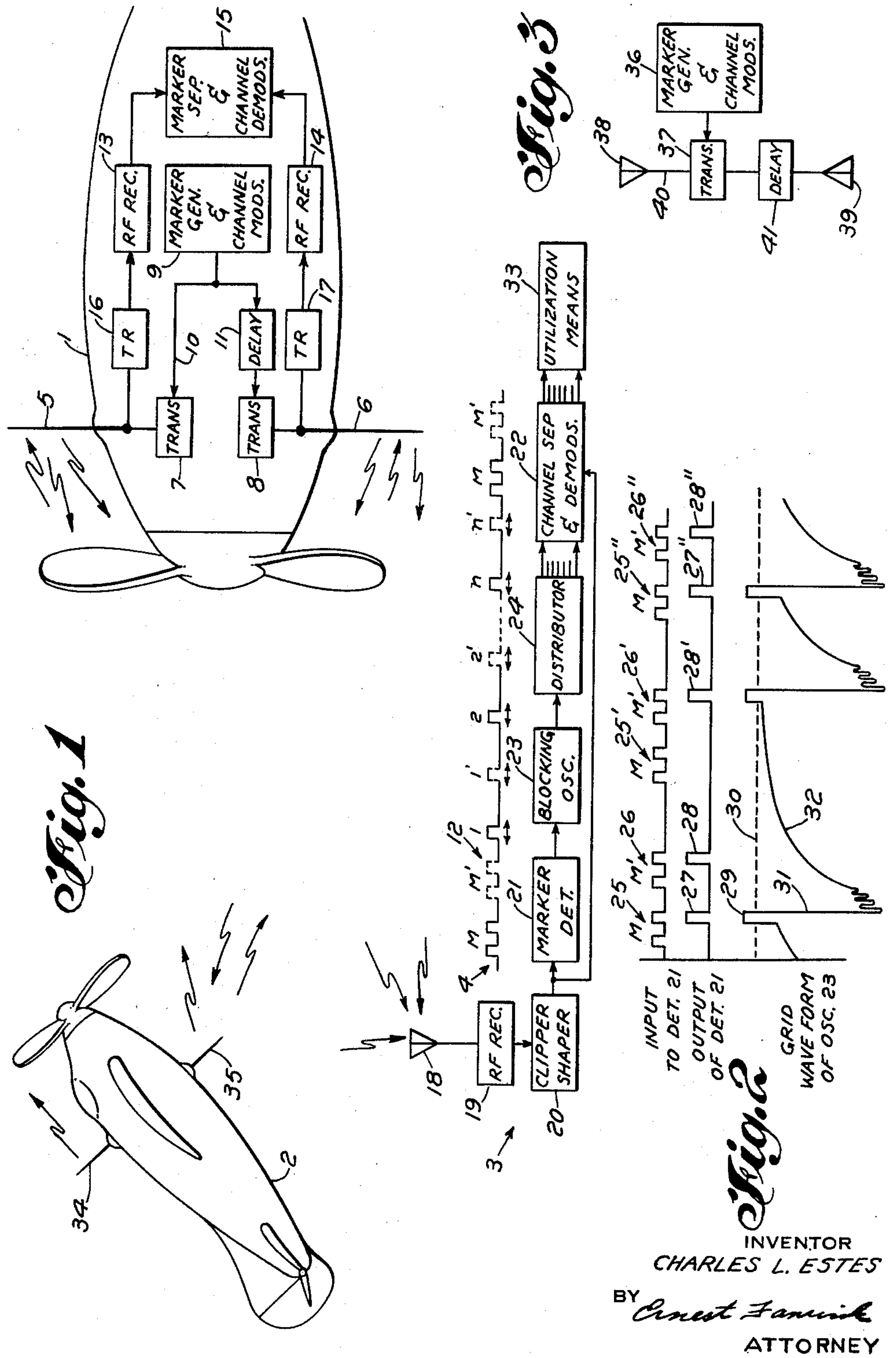
Fig. 1 is a schematic diagram in block form of an embodiment of a communication system following the principles of this invention.
Fig. 2 is a graph of wave forms useful in explaining the operation of the receiving arrangements of Fig. 1.
Fig. 3 is a schematic diagram in block form of another embodiment of the signal transmitting system in accordance with this invention.

Referring to Fig. 1, an aircraft 1 is illustrated as including the transmitting and receiving portion of a communication system utilizing, for example, pulse time modulation (PTM) to transmit and receive intelligence from another moving vehicle, such as aircraft 2, or a ground station 3. The intelligence of a single channel is conveyed by means of time positioning a channel pulse with respect to a synchronizing or marker signal with a plurality of such channels being time located with respect to the marker signal to produce a pulse train of time sequential channel pulses, such as illustrated by pulse train 4.

Radio waves are received at and transmitted from aircraft 1 by means of antennas 5 and 6 disposed at positions on the aircraft to produce a given composite radiation pattern which will reduce to a great extent the effects of the aircraft itself upon the radiation pattern of a single one of said antennas. If the antennas utilized are vertical dipoles, a substantially omnidirectional radiation pattern will result. To excite antennas 5 and 6 for transmission, radio frequency transmitters 7 and 8, respectively, are coupled thereto, with the identical carrier frequency produced by each of the transmitters being modulated in accordance with the pulse train produced by marker generator and channel modulators 9. The operation and apparatus utilized to produce the PTM pulse train for modulation of transmitters 7 and 8 is well-known in the art, such as is illustrated by Patent #2,485,591 to D. D. Grieg.

In accordance with this invention, it has been discovered that if antennas 7 and 8 are activated in time sequence, the individual signals will not beat against each other which heretofore produced a fading between the identical radiated signals. To accomplish the reduction in signal fading, the pulse train output of signal modulator 9 is coupled to radio frequency transmitter 7 directly by conductor 10 and to transmitter 8 by means of a delay device 11. Delay device 11 will introduce that amount of time delay in the conduction of the modulating signal from source 9 to transmitter 8 such that there is effectively produced a pair of pulse trains interleaved in time carrying the same intelligence, represented by pulse train 4 and pulse train 12, with no overlap or cross-talk between the interleaved pulse trains.

The sequentially timed excitation of antennas 5 and 6 effectively provides a radiation pattern of uniform signal strength for radiation to every compass point wherein the identical signals do not overlap and the possibility of fading between these two identical signals, due to their different effective distance from the receiving antenna, is greatly reduced due to the established time or phase difference therebetween.

Also coupled to antennas 5 and 6, there is illustrated, the aircraft receiving arrangement which includes a radio frequency receiver responsive to the radio waves picked up by each of the antennas, as represented by the blocks labeled 13 and 14, and marker separator and channel demodulator equipment, represented by block 15. The operation of equipment 15 is identical with the ground station marker separator and channel demodulator equipment to be hereinafter described. To enable the utilization of the same antenna for transmitting and receiving, it is the practice to provide a device to enable the transmitter signal to excite the antenna and protect the receiver equipment and then provide a coupling path from the antenna to the receiver when a signal is being received. Such a device is well-known in radar type systems and is commonly referred to as a T–R device. The T–R device of the aircraft communication system is represented by blocks 16 and 17 associated respectively with each of the antennas 7 and 8 to permit the utilization of a single antenna for both transmission and reception.

The double antenna system is utilized for reception of a radio wave in aircraft, as well as transmission therefrom, to provide a means of receiving a radio wave substantially all the time even if one of the antennas is completely ineffective for reception of a radio wave. The aircraft receiving arrangement does not need to incorporate a delay device as does the transmitting arrangement since the equipment 15, as will be described hereinbelow, incorporates a means enabling the locking of the channel demodulator, by means of the marker separator, to a single one of the pulse trains. The pulse train to which the demodulator equipment is locked will normally be the first pulse train received, but if the signal level of this first received pulse train is not sufficient, the demodulator equipment will be locked to the second pulse train.

The ground receiving arrangement 3 illustrated in the Fig. 1 includes an antenna 18 for receiving the radio wave including the interleaved pulse train modulation transmitted from an airborne station. The intercepted radio wave is coupled to radio frequency receiver 19 for extracting the modulation carried by the radio wave. The detected interleaved pulse trains are then coupled to the clipper-shaper 20 for reshaping and noise removal prior to being coupled to the marker detector 21 and channel signal demodulators 22. The output of shaper 20 is simultaneously coupled to the marker signal detector 21 and the channel separator and demodulators 22. The detector 21 having an organization substantially as disclosed in Patent #2,485,591 is responsive to a double pulse type of marker signal for producing a gating pulse synchronized with the marker signal. This gating pulse output of detector 21 keys blocking oscillator 23 to prevent the gating output of detector 21 produced by the marker signal of the second pulse train from activating the distributor 24. The pulse output of oscillator 23 activates the distributor 24, such as a delay line, to produce a sequence of keying pulse displaced in time from each other. The channel pulses of the selected pulse train are demodulated in demodulator 22 in response to the keying pulses delivered from distributor 24.

The marker signal detector 21, distributor 24 and channel demodulators 22 of this invention have schematic circuits well-known in the art as represented by the circuitry of Patent #2,485,591. To assure that the demodulation circuitry operates on only one of the interleaved pulse train means are provided to enable only one of the marker signals to activate the distributor 24. Blocking oscillator 23 at the output of detector 21 provides this assurance for demodulating only one of the pulse trains, usually the first pulse train received by the receiver.

With reference to Fig. 2, the operation of blocking oscillator 23 is easily understood with reference to locking the operation of the channel demodulators 22 to the marker signal of a given pulse train. The marker signals 25 and 26 of the first and second pulse trains are coupled to the detector 21 which operates to produce a single output pulse in a manner as disclosed in Patent #2,485,591. These gating pulses 27 and 28, respectively, produced from marker signals 25 and 26, are coupled to the grid input of a blocking oscillator 23. The oscillator 23 may take the form of any well-known blocking oscillator, such as will be found in elementary textbooks, or the form disclosed in the copending application of A. M. Levine and H. Altman, Serial No. 386,810, filed October 2, 1953.

If the attitude of the aircraft is such that both pulse trains have receivable signal strength, gating pulse 27, the result of marker signal 25, will activate oscillator 23 to produce an output pulse 29 and then drive the tube of the oscillator well below cut-off point 30. This negative excursion is represented by line 31. The time constant associated with the oscillator will control the exponential portion 32 such that its period of operation will be longer than the time between the negative excursion 31 and the occurrence of the second marker signal produced gating pulse of the next period. Thus, if the first pulse train for some reason is not received by the receiver, the second marker signal produced gating pulse 28′ will activate the oscillator 23. In the following period, if the first signal is again received the oscillator 23 will be activated by the resulting gating pulse 27''. The negative excursion of the blocking oscillator is of course the characteristic thereof which prevents the gating pulse of the second marker signal for the same period from energizing the distributor 24.

By this arrangement, the receiver equipment, ground or airborne, utilized in conjunction with the transmission system of this invention is able to discriminate between the interleaved pulse trains and to produce at all times in the channel utilization means 33, an output representative of the modulating signal generated in modulating source 9 regardless of any fading of the signal which may occur over the propagation distance.

It will be recognized that by time sequential transmission of identical signals, an effective uniform antenna pattern is produced to facilitate a uniform signal for transmission to a receiving device and likewise the disposition of the antennas enables the reception of the signal at the receiving portion thereof regardless of whether the metallic structure of the aircraft interferes or distorts the antenna pattern of one of the dipole antennas on the aircraft and at the same time tends to eliminate the interference between the two radiated signals caused by a difference in propagating distance between the receiving antenna and the transmitting antennas.

The advantage of the time sequential transmission of a signal from a pair of antennas has the advantage that a receiving station will be able to receive a transmitted radio wave at substantially all times even if the radio wave from one antenna is blocked or otherwise distorted by the aircraft. For instance, consider aircraft 2 having identical equipment as described in conjunction with aircraft 1 transmitting a signal to both aircraft 1 and ground station 3. The attitude of aircraft 1 may be such that the radio wave from antenna 34 is blocked or otherwise distorted such that its radiation is ineffective for communication with the selected receiver. Thus, antenna 35 will carry on the communication between the receiving points. The attitude of aircraft 1 may be such that the antennas 5 and 6 may each receive the pulse train radiated from antenna 35. If the propagation distance between antenna 35 and the antennas 5 and 6 are equal the phasing of the two outputs of receivers 13 and 14 will activate the demodulators 15 with a resulting increase in audio signal level, however, this increase will not be sufficient to render the communication system undesirable.

If the propagation distance between antenna 35 and antennas 5 and 6 are unequal to the extent that a phase difference between the outputs of receivers 13 and 14 is present, the blocking oscillator of marker separator and channel demodulator 15 will lock the demodulation process to the first received pulse train and will reject the second received pulse train. On the other hand if the aircraft 1 is so disposed that say antenna 5 is ineffective as far as receiving a radio wave from antenna 35, antenna 6 will provide the reception of the radiated wave and ultimate demodulation of the signal carried thereby.

These examples of radiation and reception with respect to the aircraft attitude demonstrate the advantage of a communication system of this invention for air-to-air and air-to-ground communication to substantially eliminate the loss of signal due to the aircraft interfering with the radiation pattern of a single antenna arrangement.

Referring to Fig. 3, there is illustrated another embodiment of this invention incorporating a single modulating source 36 comprising a plurality of channel modulators and a means to combine the outputs of the channel modulators and a synchronizing signal to form a pulse train. This equipment would be identical with the equipment of source 9. In this embodiment, as in the embodiment of Fig. 1, the production of this pulse train is carried on by equipment well-known in the art. The resultant pulse train is coupled to a transmitter 37 which is pulsed in accordance to the pulse train. The modulated radio frequency energy therefrom is coupled to antennas 38 and 39. These antennas are disposed on the upper and lower surfaces, respectively, of an aircraft in much the same manner as antennas 5 and 6 of Fig. 1. The energy from transmitter 21 is coupled directly to antenna 38 by conductor 40 and to antenna 39 through delay device 41 to produce, as in Fig. 1, an interleaved pulse train. The receiving of these interleaved pulse trains will be accomplished as in Fig. 1.

The only difference between the transmitter of Fig. 1 and Fig. 3 is the location of the delay device. In Fig. 1 the modulating signal is delayed at video signal frequency while in Fig. 3 the modulating signal is delayed at a radio frequency signal level. The arrangement of Fig. 1 requires more equipment than the arrangement of Fig. 3, but the length of the delay line of Fig. 3 may in some instances place a practical limitation on the size of aircraft which can employ the arrangement of Fig. 3.

While I have described above the principles of my invention in connection with specific apparatus, it is to be clearly understood that this description is made only by way of example and not as a limitation to the scope of my invention as set forth in the objects thereof and in the accompanying claims.

I claim:

1. A signal receiving system utilized in combination with a moving vehicle for detecting the modulation signal in a composite radio wave having two identical modulation portions, one following the other in time relation, comprising a radio frequency receiving arrangement responsive to said composite radio wave, means coupled to said receiving arrangement to normally select a given one of said modulation portions when said given one is of receivable signal strength and to respond to the other of said portions when said given portion is not of a receivable signal strength and means coupled to said last mentioned means and said receiving arrangement to demodulate and utilize the selected one of said modulation portions, said modulation portions each including a pulse train having a marker signal and at least one channel signal displaced in time from said marker signal and said selecting means includes a marker signal detector responsive to the marker signals of said pulse trains to produce a gating pulse for each receivable modulation portion and a blocking oscillator coupled to the output of said signal detector responsive to the first of said gating pulses and non-responsive to the second of said gating pulses when said given portion is of receivable signal strength and responsive to the second of said gating pulses when said given portion is not of a receivable strength, said demodulating means being activated by the output of said blocking oscillator to demodulate the channel signal of the selected modulation portion.

2. A communication system utilized in conjunction with a moving vehicle comprising at least two antennas cooperating from different positions on said vehicle to provide a given composite radiation pattern, a source of modulating signals, coupling means coupling said source to said antennas in time sequence to radiate a composite radio wave having two identical modulation portions, one following the other in time relation, and a receiver for receiving said composite radio wave having means for selecting a given one of said modulation portions when said given one is of a predetermined signal strength and to respond to the other of said portions when said given portion is not of a predetermined signal strength, said means for selecting including means for blocking the unselected modulation portion when said given one of said modulation portions is of said predetermined signal strength, said modulating portions each including a pulse train having a synchronizing signal and at least one channel signal in a given time relation to said synchronizing signal and said coupling means including a delay device disposed between said source and one of said antennas to provide a composite radio wave of identical interleaved pulse trains and said selecting means including a synchronizing signal detector responsive to the synchronizing signals of said pulse trains to produce a gating pulse for each receivable modulation portion, a blocking oscillator, means controlled by said oscillator for demodulating the selected one of said pulse trains, means coupling the output of said oscillator to said means demodulating and means coupling the input of said oscillator to the output of said signal detector, said oscillator being responsive to the first of said gating pulses and non-responsive to the second of said gating pulses when said given portion is of receivable signal strength and responsive to the second of said gating pulses when said given portion is not of a receivable signal strength.

3. A signal receiving system utilized in conjunction with a moving vehicle for detecting the modulation signal in a composite radio wave having two identical modulation portions, one following the other in time relation, comprising a radio frequency receiver responsive to said composite radio wave, means coupled to said receiver for selecting a given one of said modulation portions when said given one is of a receivable signal strength and to respond to the other of said portions when said given portion is not of a receivable signal strength and means coupled to said receiver and said last mentioned means, under control of said last mentioned means, to demodulate and utilize the selected one of said modulation portions, the unselected modulation portion being blocked from said demodulating means by said means selecting when said given modulation portion is of said predetermined signal strength, said modulation portions each including a synchronizing signal and said selecting means including a synchronizing signal detector responsive to the synchronizing signals of said modulation portions to produce a gating pulse therefrom to cooperate in demodulating their respective modulation portions and a blocking oscillator coupled to the input of said demodulating means and the output of said signal detector responsive to the first of said gating pulses and non-responsive to the second of said gating pulses when said given portion is of receivable signal strength and responsive to the second of said gating pulses when said given portion is not of a receivable signal strength to activate said demodulating means for the demodulation of only that modulation portion associated with the gating pulse passed by said blocking oscillator.

4. A signal receiving system utilized in conjunction with a moving vehicle for detecting the modulation signal in a composite radio wave having two identical modulation portions, one following the other in time relation, comprising a radio frequency receiver responsive to said composite radio wave, means coupled to said receiver for selecting a given one of said modulation portions when said given one is of a receivable signal strength and to respond to the other of said portions when said given portion is not of a receivable signal strength and means coupled to said receiver and said last mentioned means, under control of said last mentioned means, to demodulate and utilize the selected one of said modulation portions, the unselected modulation portion being blocked from said demodulating means by said means selecting when said given modulation portion is of said predetermined signal strength, said modulation portions each including a pulse train having a marker signal and at least one channel signal displaced in time from said marker signal and said selecting means including a marker signal detector responsive to the marker signals of said pulse trains to produce a gating pulse for each receivable modulation portion and a blocking oscillator coupled to the input of said demodulating means and to the output of said signal detector responsive to the first of said gating pulses and non-responsive to the second of said gating pulses when said given portion is of receivable signal strength and responsive to the second of said gating pulses when said given portion is not of a receivable signal strength.

References Cited in the file of this patent

UNITED STATES PATENTS

| | | |
|---|---|---|
| 2,494,309 | Peterson et al. | Jan. 10, 1950 |
| 2,497,958 | Peterson et al. | Feb. 21, 1950 |
| 2,531,453 | Marchand | Nov. 28, 1950 |
| 2,610,292 | Bond et al. | Sept. 9, 1952 |
| 2,698,896 | Rinia | Jan. 4, 1955 |